United States Patent
Cappelli et al.

(10) Patent No.: US 11,268,314 B2
(45) Date of Patent: Mar. 8, 2022

(54) CLUTCH ASSEMBLY FOR POWERED DOOR SYSTEM

(71) Applicant: MAGNA CLOSURES INC., Newmarket (CA)

(72) Inventors: Mario Cappelli, San Giuliano Terme (IT); Sandro Bertini, Leghorn (IT)

(73) Assignee: MAGNA CLOSURES INC., Newmarket (CA)

(*) Notice: Subject to any disclaimer, the term of this patent is extended or adjusted under 35 U.S.C. 154(b) by 114 days.

(21) Appl. No.: 16/820,086

(22) Filed: Mar. 16, 2020

(65) Prior Publication Data
US 2020/0291707 A1 Sep. 17, 2020

Related U.S. Application Data

(60) Provisional application No. 62/818,822, filed on Mar. 15, 2019.

(51) Int. Cl.
*E05F 11/24* (2006.01)
*E05F 15/41* (2015.01)
(Continued)

(52) U.S. Cl.
CPC .............. *E05F 15/41* (2015.01); *E05F 15/63* (2015.01); *F16D 15/00* (2013.01);
(Continued)

(58) Field of Classification Search
CPC .......... E05F 15/41; E05F 15/63; F16D 15/00; F16D 2023/123; B60K 15/05; B60K 2015/053; B60K 2015/0576; E05B 83/34; E05B 81/25; F16H 21/44; F16H 1/06; E05Y 2201/43; E05Y 2900/531;
(Continued)

(56) References Cited

U.S. PATENT DOCUMENTS 5,907,885 A * 6/1999 Tilli .......................... B60S 1/26
15/250.16
5,996,754 A * 12/1999 Reed, Jr. ................. F16D 21/06
192/111.18
(Continued)

FOREIGN PATENT DOCUMENTS

CN 101418836 A 4/2009
CN 201225370 Y 4/2009
(Continued)

*Primary Examiner* — Chi Q Nguyen
(74) *Attorney, Agent, or Firm* — Dickinson Wright PLLC

(57) ABSTRACT

A power actuation system for a motor vehicle closure panel includes a motor configured to rotate an input gear member that is configured to rotate an output gear member. The output gear member being coupled with a lever that is coupled to the closure panel. A clutch assembly configured for movement between a lever driving position whereat the lever is caused to pivot in response to rotation of the input gear member and a lever releasing position whereat the lever can pivot independent of the input gear member. The clutch assembly being biased into the lever driving position and having at least one roller configured to move out of a detent of the clutch assembly to move the clutch assembly from the lever driving position to the lever releasing position in response to a force applied to the closure panel.

20 Claims, 11 Drawing Sheets

(51) Int. Cl.
*E05F 15/63* (2015.01)
*F16D 15/00* (2006.01)

(52) U.S. Cl.
CPC ... *E05Y 2201/216* (2013.01); *E05Y 2800/116* (2013.01); *E05Y 2900/532* (2013.01)

(58) Field of Classification Search
CPC .......... E05Y 2800/11; E05Y 2800/116; E05Y 2800/26; E05Y 2201/236; E05Y 2201/712; E05Y 2201/216; E05Y 2900/532; E05Y 2201/71; E05Y 2201/626; B60J 5/108
USPC ................. 49/342, 325, 324, 349, 352, 348; 220/86.2
See application file for complete search history.

(56) References Cited

U.S. PATENT DOCUMENTS

| | | | |
|---|---|---|---|
| 6,155,124 A * | 12/2000 | Wirths | E05B 81/14 292/201 |
| 6,181,094 B1 | 1/2001 | Menke | |
| 6,270,147 B1 | 8/2001 | Butler et al. | |
| 6,435,600 B1 * | 8/2002 | Long | B60J 5/06 296/155 |
| 6,557,911 B2 * | 5/2003 | Nelsen | E05B 81/14 292/201 |
| 6,575,864 B1 | 6/2003 | Dean | |
| 6,719,333 B2 * | 4/2004 | Rice | E05B 81/14 292/201 |
| 6,764,113 B1 * | 7/2004 | Cetnar | E05B 81/06 292/201 |
| 6,843,353 B2 | 1/2005 | Majewski | |
| 6,962,023 B2 | 11/2005 | Daniels et al. | |
| 8,020,683 B2 | 9/2011 | Borys et al. | |
| 8,677,690 B2 * | 3/2014 | Lee | E05B 81/25 49/325 |
| 9,140,037 B2 * | 9/2015 | Nagaoka | E05B 85/02 |
| 9,174,517 B2 | 11/2015 | Scheuring et al. | |
| 9,194,162 B2 * | 11/2015 | Perkins | E05B 77/12 |
| 9,573,446 B2 | 2/2017 | Scheuring et al. | |
| 9,976,332 B2 | 5/2018 | Scheuring et al. | |
| 10,598,263 B2 * | 3/2020 | Martinez | F16H 19/04 |
| 2003/0089041 A1 * | 5/2003 | Daniels | E05F 15/63 49/341 |
| 2015/0233147 A1 * | 8/2015 | Martinez | E05B 81/25 292/142 |
| 2015/0376929 A1 | 12/2015 | Scheuring et al. | |

FOREIGN PATENT DOCUMENTS

| | | |
|---|---|---|
| CN | 101550972 A | 10/2009 |
| EP | 2039572 B1 | 9/2011 |
| JP | H1061287 A | 3/1998 |
| JP | 2012067793 A | 4/2012 |

* cited by examiner

CLUTCH ASSEMBLY FOR POWERED DOOR SYSTEM

CROSS-REFERENCE TO RELATED APPLICATION

This application claims the benefit of U.S. Provisional Application Ser. No. 62/818,822, filed Mar. 15, 2019, which is incorporated herein by way of reference in its entirety.

FIELD

The present disclosure relates generally to powered actuation systems for motor vehicle closure panels. More specifically, the present disclosure is directed to motor vehicle closure panel powered actuation systems having a mechanically actuatable override clutch assembly.

BACKGROUND

This section provides background information related to the present disclosure which is not necessarily prior art.

In view of increased consumer demand for motor vehicles equipped with advanced comfort and convenience features, many current vehicles are now provided with power actuated systems operable via passive keyless entry systems, or sensor systems, to permit powered actuation (opening and/or closing) of a closure panel, e.g. liftgate, door, hood, trunk lid, or otherwise. Although such power actuated systems provide desired functionality to the closure panel under normal operating conditions, sometimes it becomes desired to be able to "override" the power actuated system to interrupt or otherwise alter the automated movement of the closure panel. For example, it may be desired to suddenly stop the automated movement of the closure panel if the closure panel is about to impact an object, or upon the closure panel impacting an object without harming the closure panel and the impacted object, or it may be desired to suddenly accelerate and/or reverse the direction of movement of the closure panel, all without causing damage to components of the power actuated system.

Accordingly, what is needed is a powered actuation system that includes a mechanically actuatable clutch assembly that is reliable (regardless of surface finish deterioration of internal components of the powered actuation system and regardless of environmental conditions, e.g. temperature), lightweight, has relatively few operable components, thereby being economical, and exhibits a long a useful life.

As such, while commercially-available powered actuated systems for vehicle closure panels are satisfactory to meet all operational and regulatory requirements, a recognized need exists to advance the technology and provide optimized powered actuated systems having a reliable and easy-to-actuate manual override/actuation clutch mechanism that is efficient in use, cost efficient in manufacture and assembly and that minimizes package size and weight.

SUMMARY

This section provides a general summary of the disclosure and is not intended to be interpreted as a comprehensive and exhaustive listing of its full scope or all of its aspects, features and structured configurations.

It is an aspect of the present disclosure to provide a powered actuation system for a vehicle closure panel having a power release mechanism and a manually actuatable clutch assembly that address at least those issues discussed above.

It is a related aspect of the present disclosure to provide a powered actuation system for a vehicle closure panel having a power release mechanism and a manually actuatable clutch assembly, wherein the power release mechanism automatically detects when the manually actuatable clutch assembly is actuated by a predetermined magnitude of force, thereby allowing the power release mechanism to be automatically deactivated.

In a related aspect, a powered actuation system for a vehicle closure panel is provided having a power release mechanism and a mechanical clutch assembly that is reliably actuatable upon encountering a predetermined force having a minimal range of variability over its useful life.

In accordance with these and other aspects, a power actuation system for a closure panel of a motor vehicle is provided. The power actuation system includes an extendable member, a clutch assembly and a motor. The extendable member has an output end and an input end and is configured for attachment to one of a vehicle body of the motor vehicle and the closure panel. The clutch assembly has an output clutch plate operably coupled to the input end of the extendable member and an input clutch plate. The input clutch plate and the output clutch plate are configured to move conjointly with one another in an engaged state when a torque between the input clutch plate and the output clutch plate are below a threshold torque and to move relative to one another in a disengaged state when a torque between the input clutch plate and the output clutch plate exceeds the threshold torque. The motor is operably attached to the other of the vehicle body and the closure panel from the extendable member. The motor is operably coupled with the input clutch plate to move the extendable member in response to energization of the motor to move the closure panel when the clutch assembly is in the engaged state.

In accordance with a further aspect, a first transmission component is operably coupled to the motor and the input clutch plate of the clutch assembly, and a second transmission component is operably coupled to the input end and the output clutch plate of the clutch assembly.

In accordance with a further aspect, the input clutch plate and the output clutch plate are configured to move in a relative relationship to one another while in the disengaged state until the input clutch plate and the output clutch plate are configured to return to the engaged state upon the input clutch plate and the output clutch plate moving in an opposite relative directions.

In accordance with a further aspect, the input clutch plate and the output clutch plate are configured to transition from the engaged state to the disengaged state at a relative position to one another, and are then configured to transition from the disengaged state to the engaged state upon the input clutch plate and the output clutch plate returning to the relative position.

In accordance with a further aspect, the power actuation system further includes a mount member configured for attachment to one of a vehicle body of the motor vehicle and the closure panel. The extendable member is a lever having a first end, configured for attachment to the other of the vehicle body of the motor vehicle and the closure panel from the mount member, and an opposite second end, wherein the lever is pivotably mounted on the mount member between the first end and the second end. The motor is configured to rotate an input gear member in direct response to energization of the motor, wherein the input gear member is configured to rotate an output gear member in direct response to rotation of the input gear member. The output gear member is operably coupled with the lever to pivot the lever in response to rotation of the output gear member. The clutch assembly is configured for movement between a lever driving position, whereat the lever is caused to pivot in response to rotation of the input gear member, and a lever releasing position, whereat the lever is free to pivot independent of movement of the input gear member. The clutch assembly is biased toward the lever driving position and has at least one roller disposed between the input clutch plate and the output clutch plate. The at least one roller is configured for rolling movement out of at least one detent to move the clutch assembly from the lever driving position to the lever releasing position in response to an external force applied to the closure panel.

In accordance with a further aspect, the second end of the lever can be provided having teeth configured for meshed engagement with the output gear member.

In accordance with a further aspect, the output clutch plate can be fixed to the output gear member and the input clutch plate can be fixed to the input gear member, wherein the output clutch plate has a substantially planar surface with a plurality of the at least one detent extending therein and wherein the input clutch plate has a substantially planar surface configured in axially aligned, overlying and generally parallel relation with the substantially planar surface of the output clutch plate, with a plurality of the at least one detent extending therein, with the at least one roller including a plurality of rollers disposed between the output clutch plate and the input clutch plate for simultaneous receipt in the plurality of detents in the output clutch plate and in the plurality of detents in input clutch plate while in the engaged state and for removal from at least some of the detents while in the disengaged state.

In accordance with a further aspect, the output clutch plate and the output gear member can be constructed as a monolithic piece of material, and the input clutch plate and the input gear member can be constructed as a monolithic piece of material.

In accordance with a further aspect, at least some of the rollers are arranged to be rolled outwardly from at least some of the detents in at least one of the output clutch plate and the input clutch plate while the clutch assembly is in the, disengaged, lever releasing position.

In accordance with a further aspect, each of the rollers is simultaneously disposed in the detents of the output clutch plate and the input clutch plate while the clutch assembly is in the engaged, lever driving position.

In accordance with a further aspect, at least some of the rollers are arranged to be rolled into abutment with the substantially planar surface of at least one of the output clutch plate and the input clutch plate while the clutch assembly is in the disengaged, lever releasing position.

In accordance with a further aspect, the rollers rolled into abutment with the substantially planar surface of at least one of the output clutch plate and the input clutch plate are arranged to remain disposed in the detents of the other of the output clutch plate and the input clutch plate, thereby having a known, detectable and/or predetermined position.

In accordance with a further aspect, the plurality detents of one of the input gear member and the output gear member is arranged in a non-uniform annular pattern about an axis of rotation, and the plurality detents of the other of the input gear member and the output gear member is arranged in a uniform annular pattern about an axis of rotation.

In accordance with a further aspect, the output clutch plate and the input clutch plate can be biased toward one another by a spring member, wherein the bias force of the spring member can be precisely provided to regulate the torque needed to move the clutch assembly from the engaged state to the disengaged state.

In accordance with a further aspect, a power actuation system for a closure panel of a motor vehicle is provided including an extendable member having an output end and an input end, wherein the extendable member is configured for attachment to one of a vehicle body of the motor vehicle and the closure panel. A clutch assembly is provided including an output clutch plate and an input clutch plate, wherein the output clutch plate is operably coupled to the input end of the extendable member by an output gear member. The input clutch plate and the output clutch plate are configured to move conjointly with one another in an engaged state when a torque between the input clutch plate and the output clutch plate are below a threshold torque, and to move relative to one another in a disengaged state when a torque between the input clutch plate and the output clutch plate exceeds the threshold torque. A motor is operably attached to the other of the vehicle body and the closure panel from the extendable member. The motor is operably coupled with the input clutch plate by an input gear member to move the extendable member in response to energization of the motor to move the closure panel when the clutch assembly is in the engaged state.

In accordance with a further aspect, a method for providing manual interruption of a powered vehicle closure panel that is pivotally coupled to a vehicle body as the closure panel is moving under power between open and closed positions is provided. The method includes providing a motor operably coupled with a first transmission component for movement of the first transmission component in opposite first and second directions and configuring the motor for operable attachment to one of the vehicle body and the closure panel. Further, providing an extendable member having a first end configured for operable attachment to the other of the vehicle body and the closure panel from the motor and an opposite second end operably coupled with a second transmission component. Further yet, operably coupling the first transmission component with an input clutch plate of a clutch assembly and operably coupling the second transmission component with an output clutch plate of a clutch assembly, and configuring the input clutch plate and the output clutch plate to rotate conjointly with one another in an engaged state when a torque between the input clutch plate and the output clutch plate are below a threshold torque during energization of the motor. Further yet, configuring the input clutch plate and the output clutch plate to rotate relative to one another in a disengaged state when a torque between the input clutch plate and the output clutch plate exceeds the threshold torque as the motor is energized.

In accordance with a further aspect, the method can further include providing a plurality of rollers disposed in detents of the input clutch plate and the output clutch plate and configuring the rollers to simultaneously remain in the detents of the input clutch plate and the output clutch plate when the torque between the input and the output are below the threshold torque and configuring at least some of the rollers to roll outwardly from the detents of at least one the input clutch plate and the output clutch plate upon the threshold torque being exceeded, thereby allowing relative rotation between the input clutch plate and the output clutch plate.

In accordance with a further aspect, the method can further include configuring the input clutch plate and the output clutch plate to rotate relative to one another while in the disengaged state until the input clutch plate and the output clutch plate return to the engaged state as the motor is energized.

BRIEF DESCRIPTION OF THE DRAWINGS

These and other aspects, features, and advantages of the present disclosure will be readily appreciated, as the same becomes better understood by reference to the following non-limiting detailed description when considered in connection with the accompanying drawings, wherein.

Corresponding reference numerals are used throughout all of the drawings to identity common components.

DETAILED DESCRIPTION OF EXAMPLE EMBODIMENTS

Figure 1:
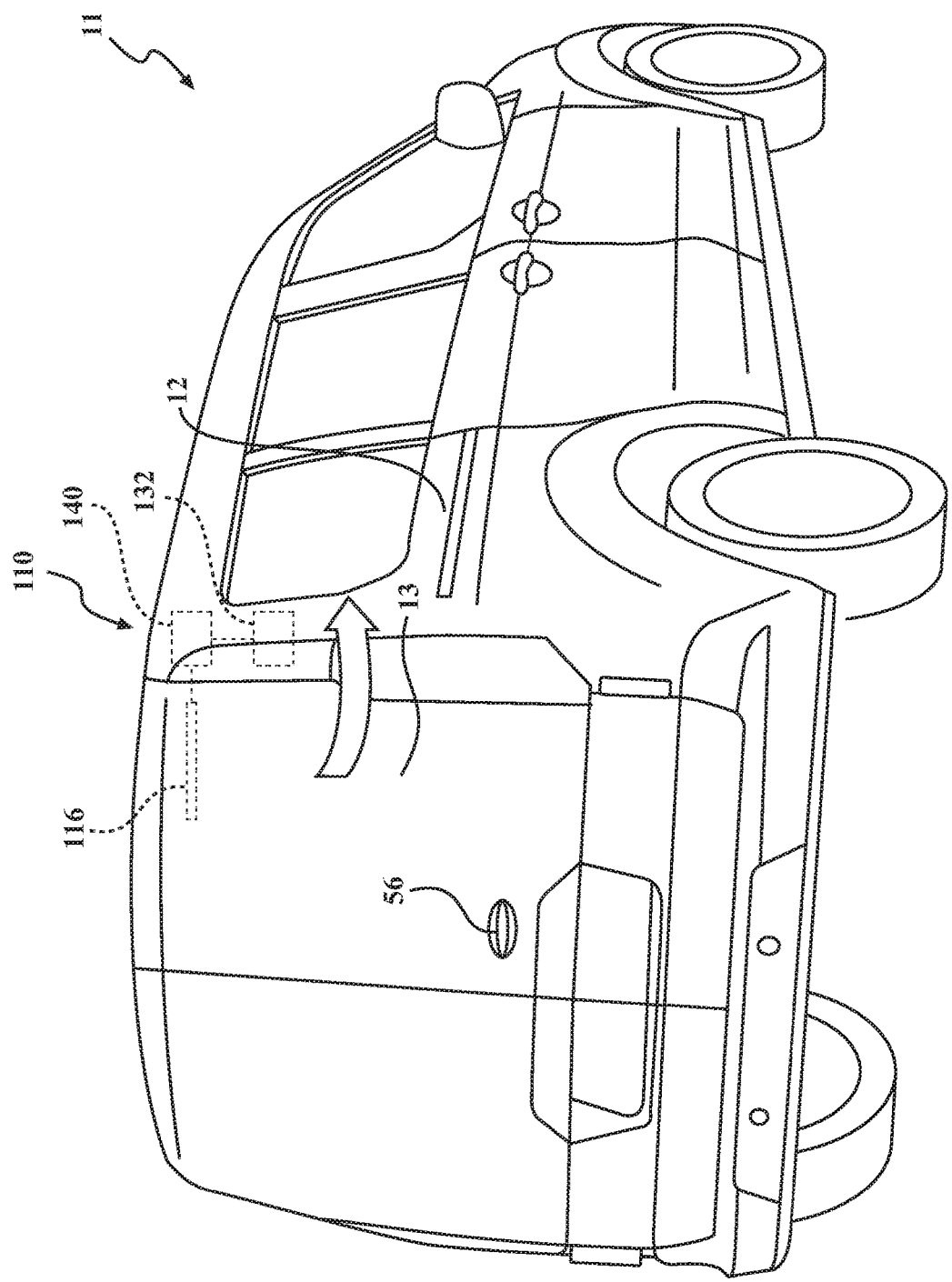
FIG. 1 is a perspective view of a motor vehicle equipped with a powered actuation system configured in operable communication with a closure panel in accordance with an aspect of the disclosure.

In general, example embodiments of a power actuation system constructed in accordance with the teachings of the present disclosure for a closure panel of a motor vehicle will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a motor vehicle 11 that has a closure panel, such as a rear door, and referred to hereafter simply as door 13, by way of example and without limitation, that is pivotably attached to a vehicle body 12 of the motor vehicle for pivoting movement between a closed position and an open position, wherein the motor vehicle 11 has a powered actuation system, referred to hereafter as actuation system 110, constructed in accordance with an aspect of the disclosure attached, configured for powered actuation to move the door 13 from the closed position to the open position and/or from the opening position to the closed position. During powered movement of the door 13 via the actuation system 110, the powered movement of the door 13 can be selectively interrupted via application of a manually applied force thereto, such as by a person and/or object, as discussed in further detail below. Then, upon interrupting the powered movement of the door 13, the door 13 can be freely manually pivoted toward the desired open and/or closed position, if desired, whereupon the powered actuation system 110 can be selectively and/or automatically reset to allow the door 13 to resume being powered for movement between the open and closed positions.

A more detailed description of a non-limiting example of a power actuation system 110, constructed in accordance with the teachings of the present disclosure, will now be provided.

Figure 2:
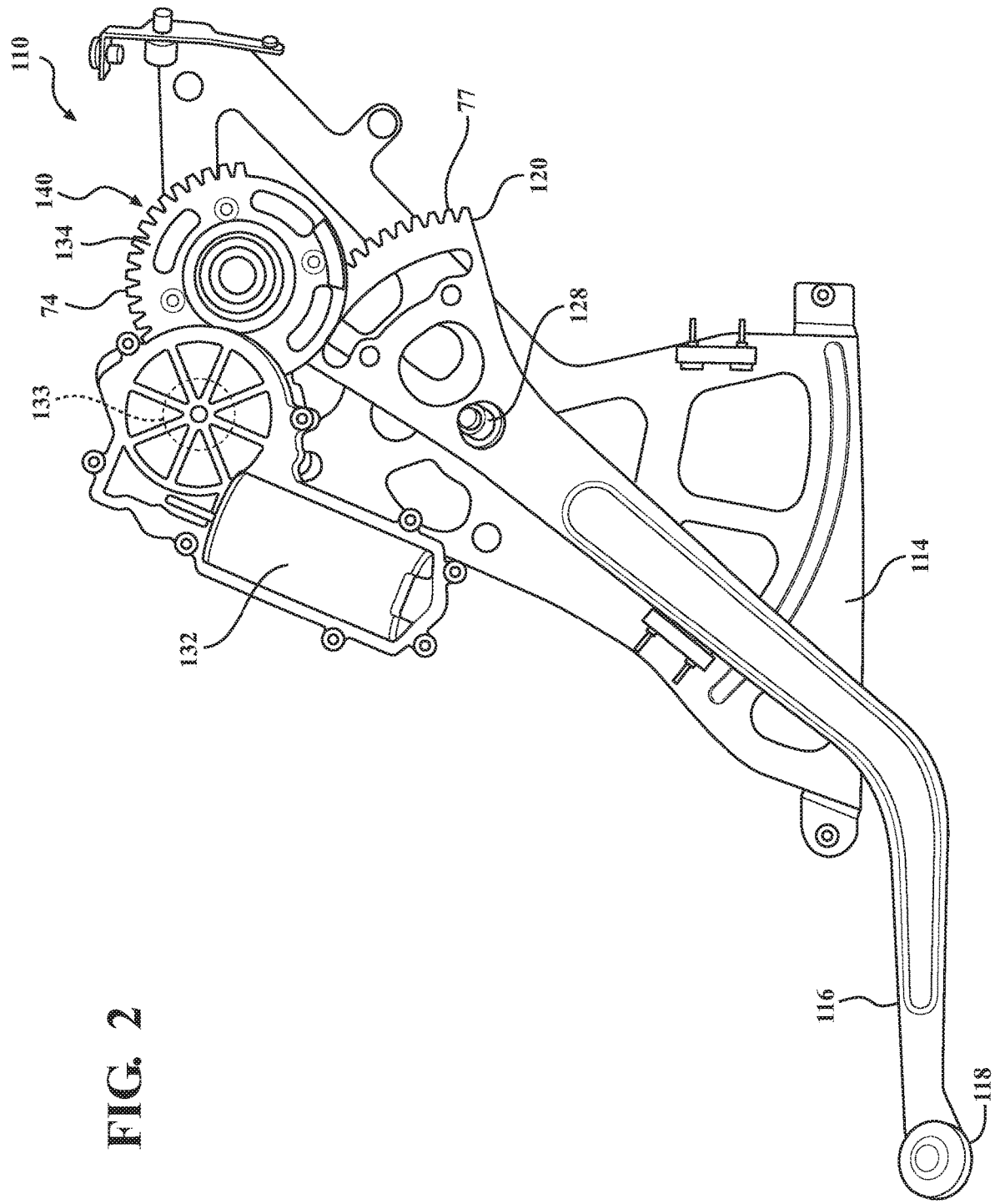
FIG. 2 is a plan view of a powered actuation system, constructed in accordance with an aspect of the disclosure, of the motor vehicle of FIG. 1.

As shown in a non-limiting embodiment in FIG. 2, the power actuation system 110 includes a mount plate, also referred to as mount member 114 (FIG. 2), configured for attachment to one of the vehicle body 12 of the motor vehicle 11 and the closure panel 13 and an elongate lever 116 having a first end 118, configured for attachment to the other of the vehicle body 12 of the motor vehicle 11 and the closure panel 13, shown, by way of example and without limitation, as the door 13, and an opposite second end 120. The elongate lever 116 also referred to as an extendable member, may include a pivoted lever as described herein moveable to assist with opening and closing the door 13, but may include other moveable mechanisms provided between the vehicle body 12 and the door 13 such as a sliding or telescoping extensible member, leadscrews, a geared configuration, or other types of levers. It is recognized that the extendable member 116 may be a rotational type member, or a linear type, or otherwise, and that the clutch assembly while described as having a rotational input and output, may be configured otherwise such as linear clutch. The lever 116 is pivotably mounted via a pin 128 on the mount member 114 between the first end 118 and the second end 120. A motor 132 is configured to move, such as rotate, an input gear member 134 in direct response to energization of the motor 132, with the input gear member 134 being configured to move, such as rotate, an output gear member 130 in direct response to rotation of the input gear member 134. The output gear member 130 is operably coupled, directly or indirectly, with the lever 116 to move, such as pivot, the lever 116 in response to driven rotation of the output gear member 130 by the input gear member 134 in response to selective engergization of the motor 132. A clutch assembly 140 is disposed between the input gear member 134 and the lever 116. The clutch assembly 140 is configured for movement between an engaged lever driving position, also referred to as engaged position, whereat the lever 116 is caused to pivot in response to driving rotation of input gear member 134, and a disengaged lever releasing position, also referred to as disengaged position, whereat the lever 116 is free to pivot independent of movement of the input gear member 134, such as may be desired if the closure panel 13 confronts an object O (post, wall, or the like) and/or if a user desires to over-ride powered actuation of the closure panel 13. The clutch assembly 140 is biased toward the lever driving position, such as via a spring member 139 (FIGS. 4A and 4B), including a Belleville spring washer, coil spring, leaf spring, or otherwise. The clutch assembly 140 includes at least one roller pawl, shown as a plurality of roller pawls, also referred to as, pawls, followers, and referred to hereafter as rollers 146, configured for rolling movement to allow the clutch assembly 140 to move between the lever driving position and the lever releasing position in response to an external force, suitable to overcome the bias imparted by spring member 139, such as may be applied to the closure panel 13. As discussed above, the externally applied force can be from an object O or a user, wherein the force required to cause movement of the clutch assembly 140 between the engaged and disengaged states or positions can be precisely regulated, at least in part by calibrating the spring force of spring member 139, due in part to the low friction rolling movement of the rollers 146.

Figure 3:
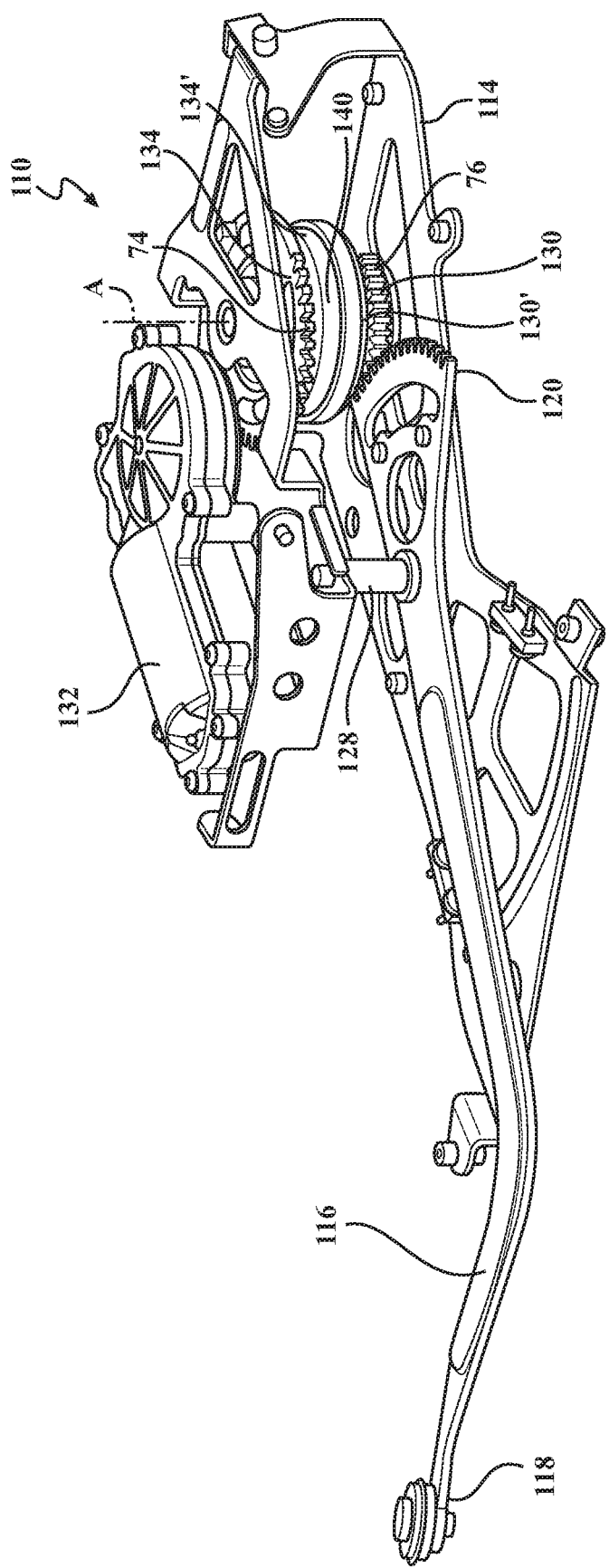
FIG. 3 is a perspective view of the powered actuation system of FIG. 2.

The clutch assembly 140, as noted above, is disposed between the input gear member 134 and the lever 116, and as shown in FIG. 3, is disposed directly between the input gear member 134 and the output gear member 130. Clutch assembly 140 includes an input clutch plate 134', an output clutch plate 130', and a plurality of the rollers 146 (rollers 146 can be a spherical ball, a cylinder or barrel shaped member, by way of example and without limitation) disposed between the input clutch plate 134' and the output clutch plate 130'. The rollers 146 are disposed for selective rolling movement between engaged positions (FIG. 4A), whereat the rollers 146 are received in axially aligned (axially, hereafter, is intended to be with reference to an axis A about which input gear member 134 and output gear member 130 rotate, unless otherwise stated) detents, also referred to as notches or recesses 150, of the input clutch plate 134' and detents, also referred to as notches, scallops or recesses 150', of output clutch plate 130', and disengaged positions (FIG. 4B), whereat at least some of the rollers 146 are removed from at least some of the axially aligned detents 150 and/or 150'. The detents 150, 150' are configured as pockets recessed into planar or substantially planar facing surfaces 70, 72 of input clutch plate 134' and output clutch plate 130', respectively. The detents 150, 150' are shaped for partial receipt of rollers 146 therein, such as spherically contoured pockets where the rollers 146 are spherical, having the same or similar radii of curvature, by way of example and without limitation.

Under normal powered operation of power actuation system 110, each roller 146 is received within one of the detents 150, 150' of each the input clutch plate 134' and output clutch plate 130', whereat rollers 146 remain seated in the detents 150, 150' under the axial bias (along axis A) imparted by spring member 139. Spring member 139 can be arranged to bias input clutch plate 134' toward output clutch plate 130', or vice versa, or a pair of spring members 139 can bias each the input and output clutch plates 134', 130' toward one another. When in the engaged position, the faces 70, 72 are shown spaced slightly from one another as a result of the detents 150, 150' having a slightly reduced depth relative to the radii of the rollers 146. The relationship of the depth of the detents 150, 150' to the radii of the rollers 146 can be selected as desired to regulate, at least in part, in combination with the spring force of spring member 139, the torque required to move the clutch assembly 140 from the engaged position to the disengaged position, as will be understood by one possessing ordinary skill in the art. While in the engaged position, the clutch assembly 140 functions to cause output gear member 130 to rotate in direct response to rotation of input gear member 134, such that output gear member 130 and input gear member 134 rotate concurrently with one another in direct response to selective engergization of motor 132. Accordingly, output gear member 130 is caused to rotate conjointly with input gear member 134 as input gear member 134 is driven by motor 132, whereupon lever 116 is caused to pivot concurrently with rotation of output gear member 130 to move closure panel 13 between open and closed positions.

Upon the resulting torque applied between the input clutch plate 134' and output clutch plate 130' reaching a predetermined threshold, at least one of the rollers 146 is caused to be rolled out (displaced) from seated relation between axially aligned detents 150, 150' such that the displaced roller(s) 146 is brought into rolling engagement with one of the planar surfaces 70, 72. In the embodiment illustrated, a pair of rollers 146, by way of example and without limitation, are shown rolled outwardly from detents 150' of output clutch plate 130' and into engagement with planar surface 72 of output clutch plate 130', with the pair of displaced rollers 146 further being rolled into receipt within detents 150'' of the input clutch plate 134' axially aligned with the planar surface 72. Accordingly, the input clutch plate 134' and output clutch plate 130' are axially spaced further from one another along the axial direction A, thereby causing the spring member 139 to be axially compressed against the spring bias thereof (FIG. 4B). With detents 150'' not being axially aligned with detents 150' in output clutch plate 130', when in the disengaged position, the resistance torque between input clutch plate 134' and output clutch plate 130' is significantly reduced from that compared to the engaged position, and thus, input clutch plate 134' and output clutch plate 130' are free or generally free to rotate relative to one another, thereby producing an override condition whereat door 13 can be moved independently from motor 132. Accordingly, output gear member 130 is free to remain stationary while input gear member 134 is being driven by motor 132, and further, output gear member 130 is free to be moved independently from input gear member 134 as input gear member 134 is being driven by motor 132. Disengagement of clutch assembly 140 can be intentionally and deliberately performed, such as via a user grasping the closure panel 13, or automatically, such as via closure panel confronting and/or impacting an object O in the path of movement of closure panel 13. Upon becoming disengaged, motor 132 can continue to cycle until input gear member 134 and input clutch plate 134' are returned to their home position, whereat clutch assembly 140 can be reset to the engaged position.

Figure 4A:
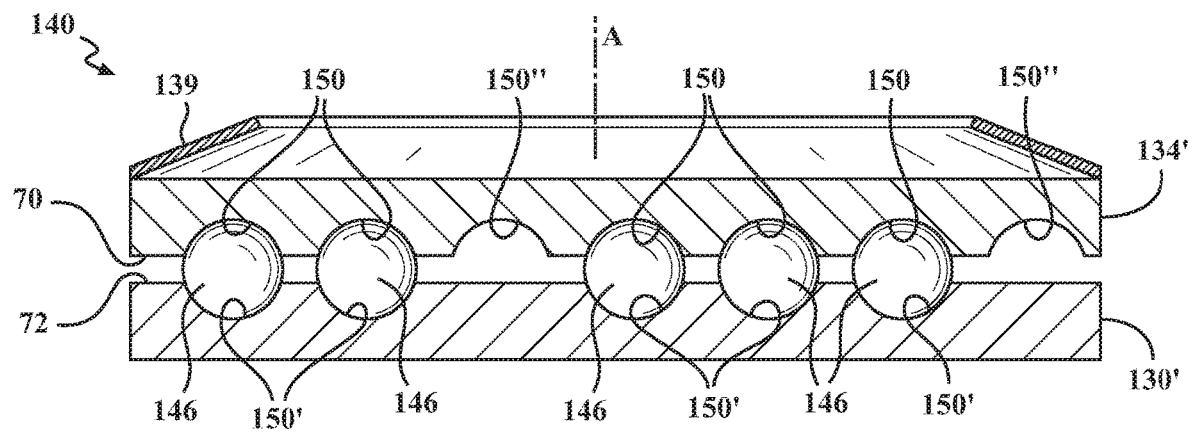
FIG. 4A is a schematic elevational view showing a portion of a clutch assembly of the power actuation system of FIG. 2 with the clutch assembly illustrated in an engaged state.
Figure 4B:
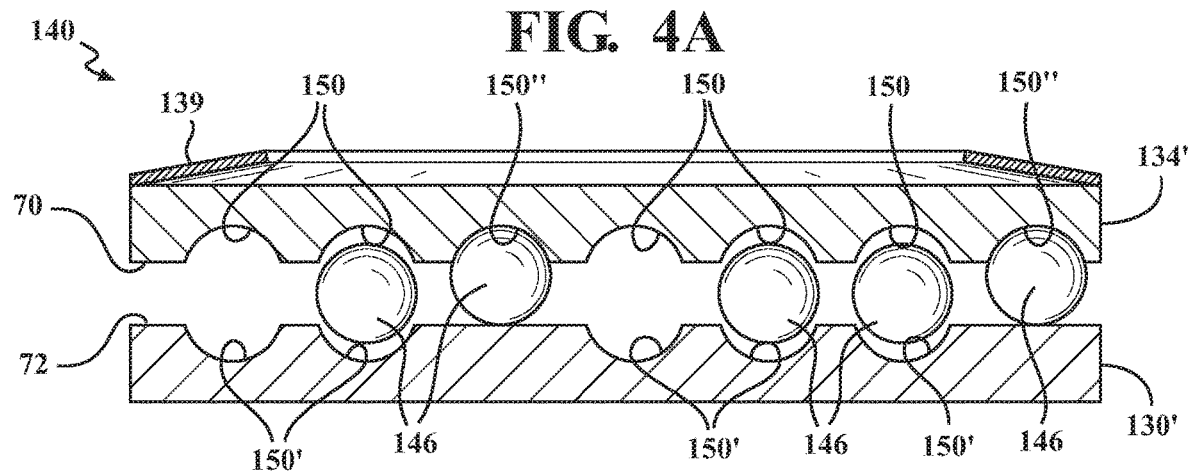
FIG. 4B is a view similar to FIG. 4A illustrating the clutch assembly in a disengaged state.
Figure 4C:
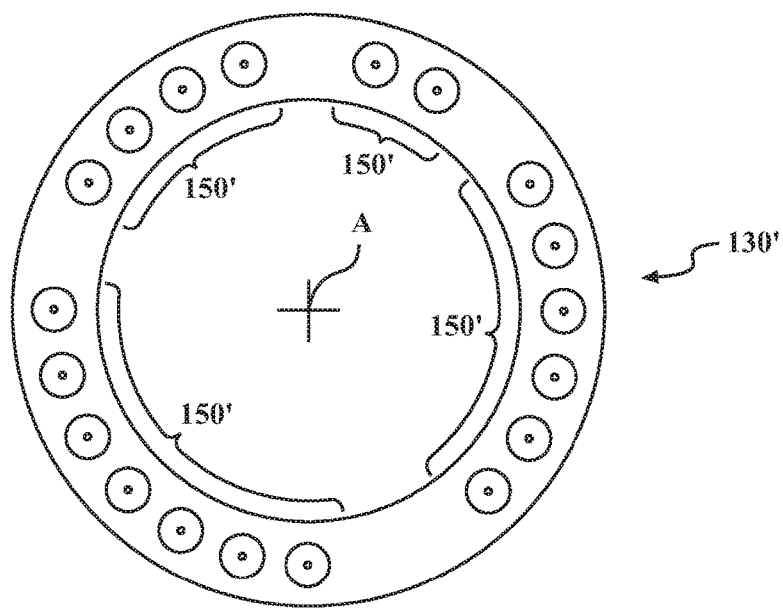
FIG. 4C is a schematic plan view illustrating an arrangement of detents in a clutch member of the clutch assembly of FIGS. 4A and 4B.

In accordance with a further aspect, as shown in FIG. 4C, at least one of the plurality detents 150' and the plurality of detents 150 extend in a non-uniform, annular pattern about the axis A of rotation of the input gear member 134 and the output gear member 130. Further, at least one of the plurality detents 150' and the plurality of detents 150 extend in a uniform, annular pattern about the axis A of rotation of the input gear member 134 and the output gear member 130. The detents 150' of output clutch plate 130' are shown, by way of example and without limitation, arranged in a non-uniform annular pattern such that upon the rollers 146 being moved to the disengaged position, at least 3 rollers 146 support the axial load across the input clutch plate 134' and output clutch plate 130'. The at least three rollers 146 removed from the detents 150' are brought into contact with planar surface 72 of output clutch plate 130' at any one time while clutch assembly 140 is in the disengaged state. This configuration shown requires a relative rotation of 360 degrees, or multiples thereof, between input clutch plate 134' and output clutch plate 130' to return clutch assembly 140 from the disengaged state to the engaged state.

Input gear member 134 and input clutch plate 134' can be constructed of separate materials and subsequently fixed to one another, such as via a suitable adhesive, fastening mechanism, weld joint, or the like, or input gear member 134 and input clutch plate 134' can be constructed as a monolithic piece of material, such as from metal or plastic. Input gear member 134 is shown having teeth 74 configured for meshed engagement with a drive gear 133 of motor 132. Similarly, output gear member 130 and output clutch plate 130' can be constructed of separate materials and subsequently fixed to one another, such as via a suitable adhesive, fastening mechanism, weld joint, or the like, or output gear member 130 and output clutch plate 130' can be constructed as a monolithic piece of material, such as from metal or plastic. Output gear member 130 is shown having teeth 76 configured for meshed engagement with teeth 77, formed at end 120, of lever 116, such that rotation of output gear member 130 causes conjoint pivotal movement of lever 116. If the aforementioned input gear member 134 and input clutch plate 134' and/or output gear member 130 and output clutch plate 130' are constructed as a monolithic piece of material, molding, casting, forging, and/or machining processes can be used, by way of example and without limitation.

Figure 5:
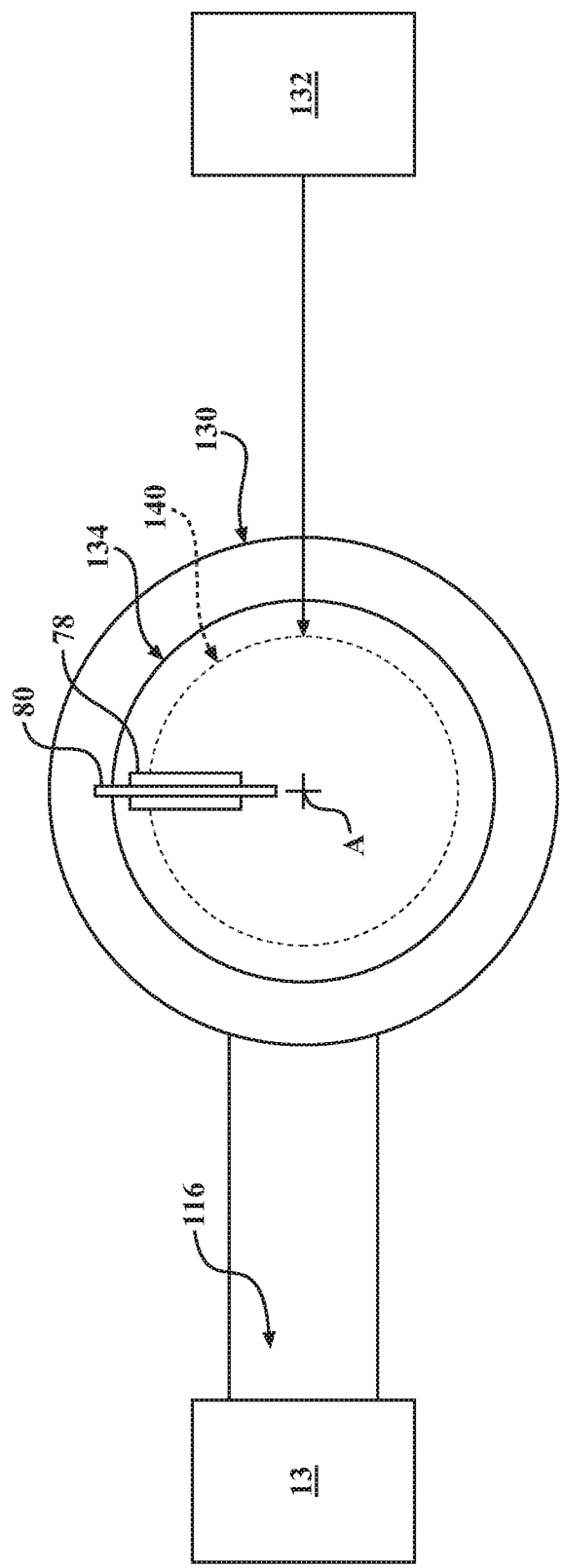
FIG. 5 is a schematic plan view of the power actuation system of FIG. 2 illustrating the clutch assembly in a rest state and a pair of clutch members of the clutch assembly in a home position.
Figure 6:
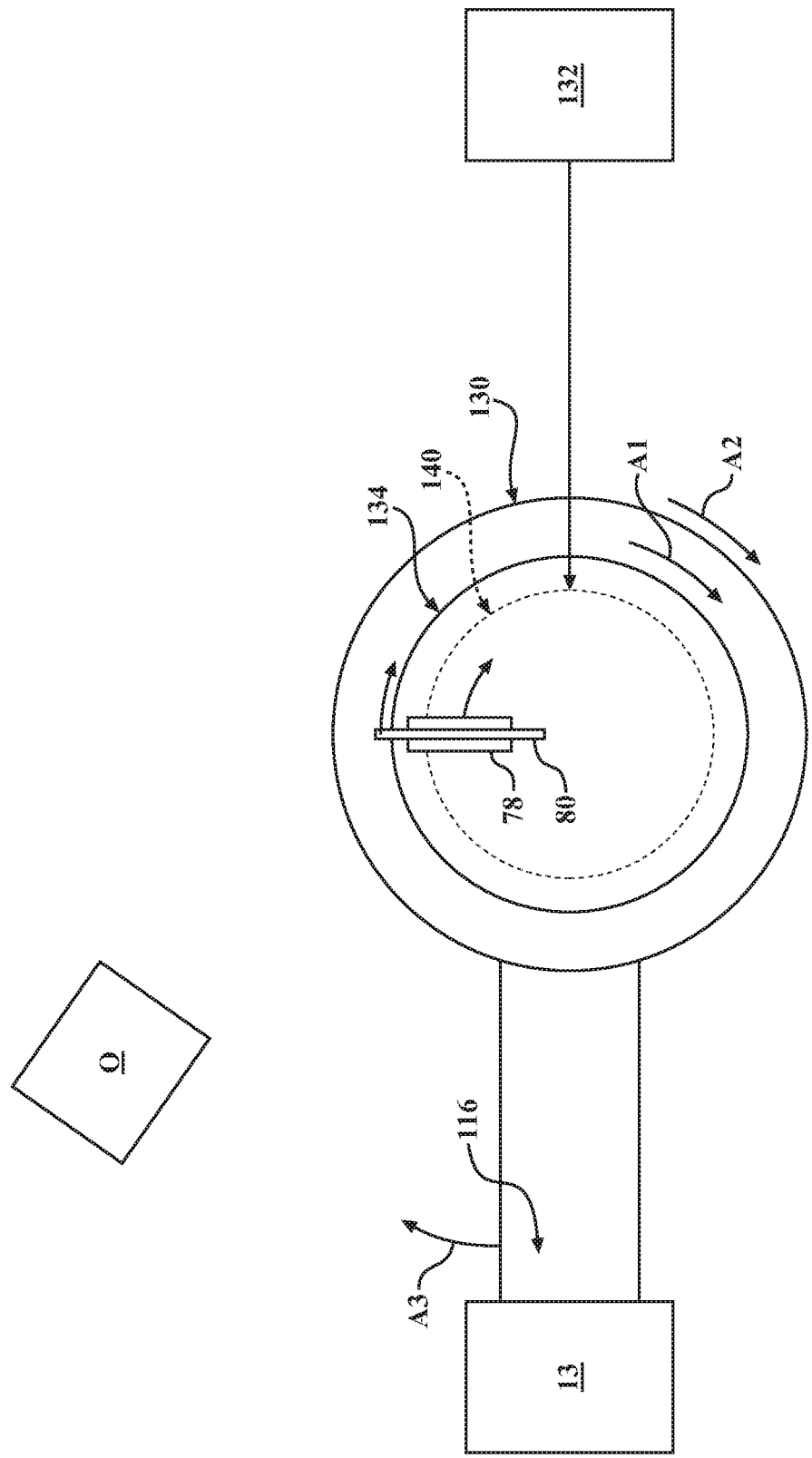
FIG. 6 is a view similar to FIG. 5 illustrating the direction of movement of a closure panel of the vehicle of FIG. 1 in response to energization of a motor of the power actuation system and conjoint movement of the pair of clutch members of the clutch assembly with one another away from the home position while in the engaged state.

In use, while in a rest state, as shown schematically in FIG. 5, while closure panel 13 is in a closed position, clutch 140 is in the engaged state (FIG. 4A). In the rest state, for reference purposes, a datum 78 of input gear member 134 and a datum 80 of output gear member 130 are aligned with one another. Then, upon energization of motor 132, as shown in FIG. 6, input gear member 134 and input clutch plate 134' are driven by motor 132 to rotate in a direction shown at arrow A1, and with clutch 140 engaged, output gear member 130 and output clutch plate 130' are driven conjointly with input gear member 134 to rotate in a direction shown at arrow A2, such that datum 78 and datum 80 rotate in alignment with one another. As output gear member 130 is driven, teeth 76 of output gear member 130 drive teeth 77 of lever 116, whereupon lever 116 is caused to be pivoted about pin 128 in a direction shown at arrow A3, thereby acting to move closure panel 13 toward an open position. The closure panel 13 continues to be moved toward the open position until a force F in excess of the predetermined torque threshold between input clutch plate 134' and output clutch plate 130' is applied to output clutch plate 130' via closure panel 13, such as via object O or via a user desiring to stop the movement of closure panel 13.

Figure 7:
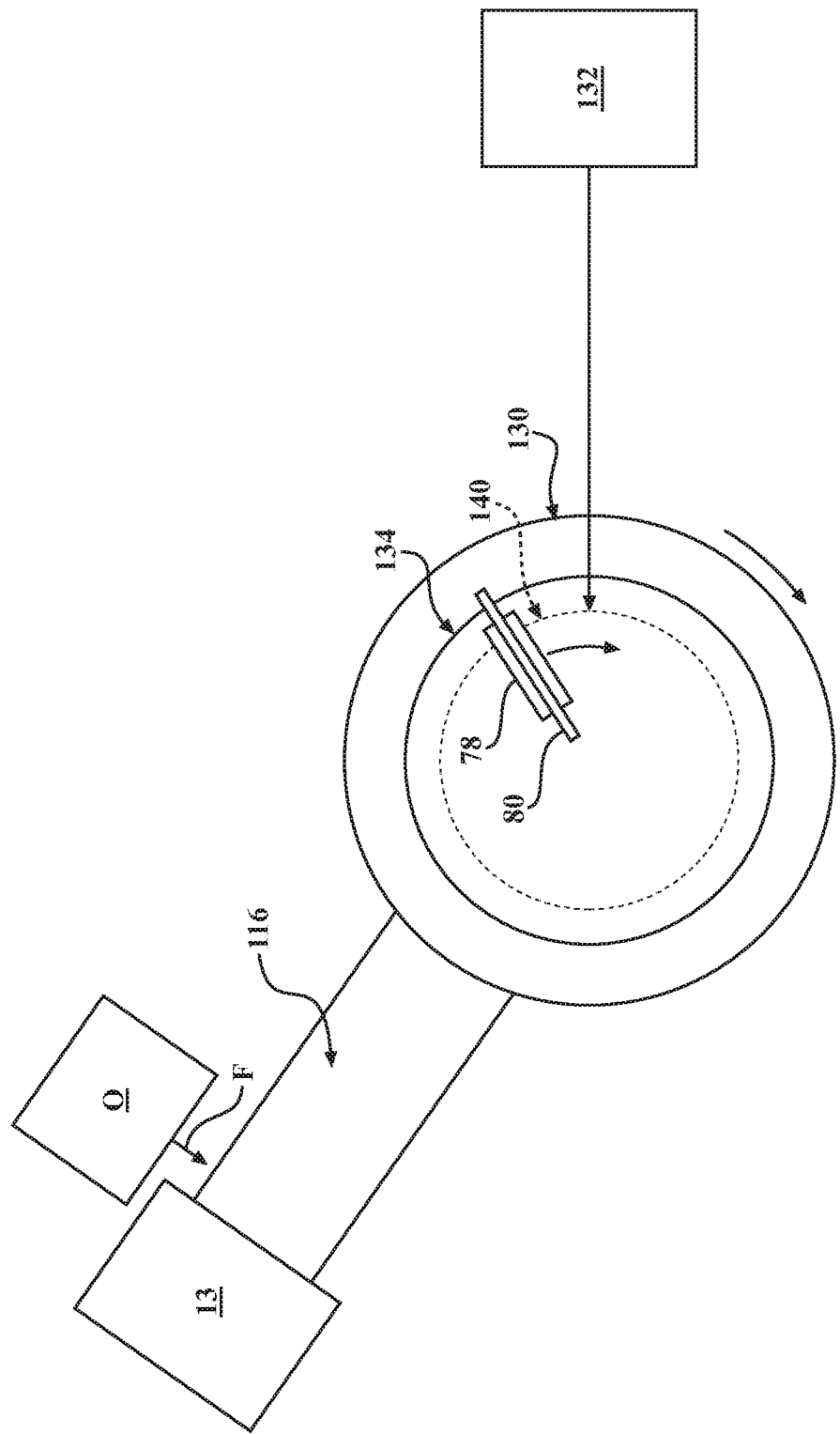
FIG. 7 is a view similar to FIG. 6 illustrating the closure panel being biased by an externally applied force against driven movement via the power actuation system with the pair of clutch members becoming disengaged from one another to allow a first clutch member of the pair of clutch members to continue movement in response to energization of the motor and a second clutch member of the pair of clutch members to be decoupled from driven relation from the first clutch member.
Figure 8:
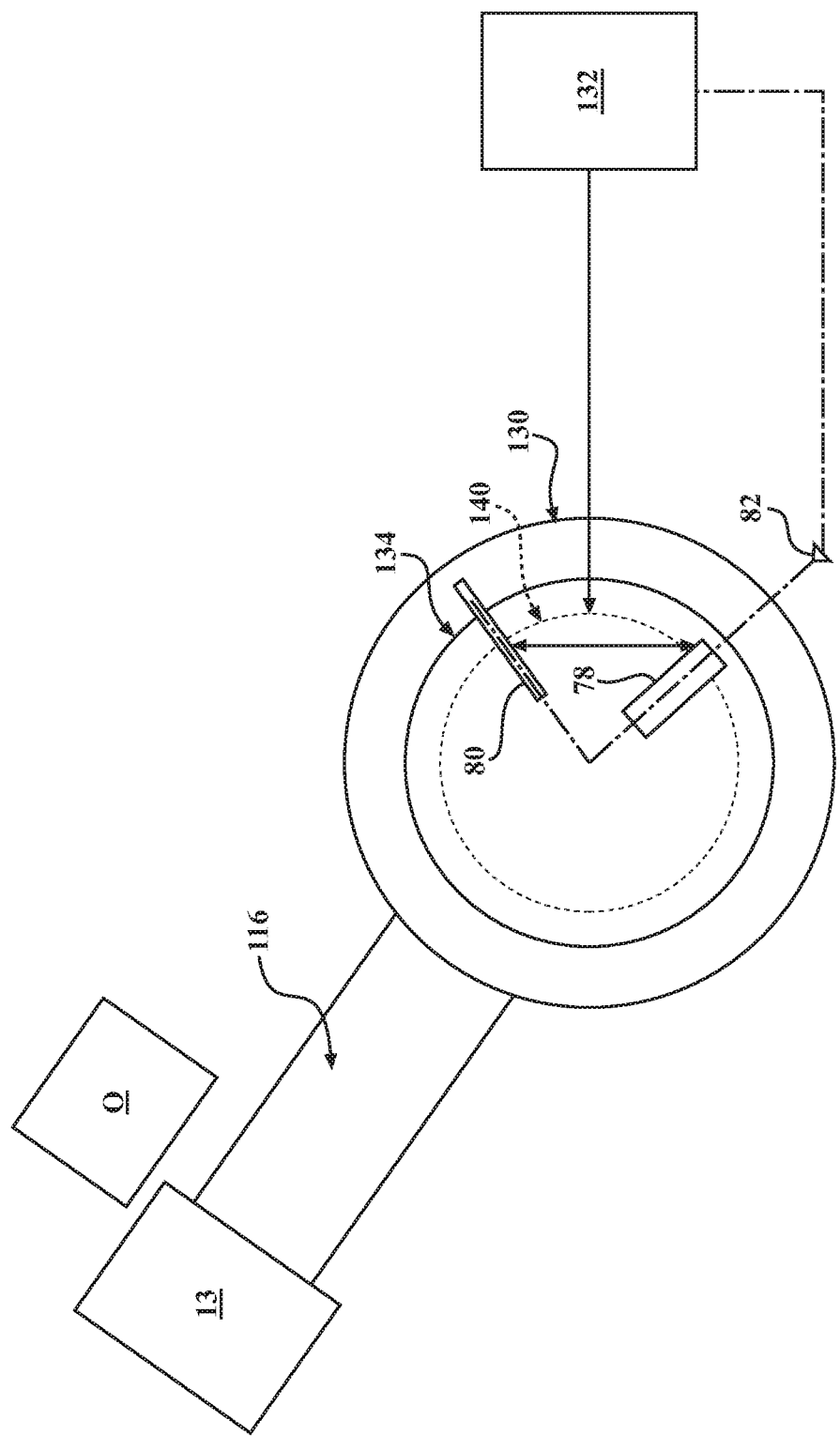
FIG. 8 is a view similar to FIG. 7 illustrating continued movement of the first clutch member, in response to energization of the motor, to an end of travel position.
Figure 9:
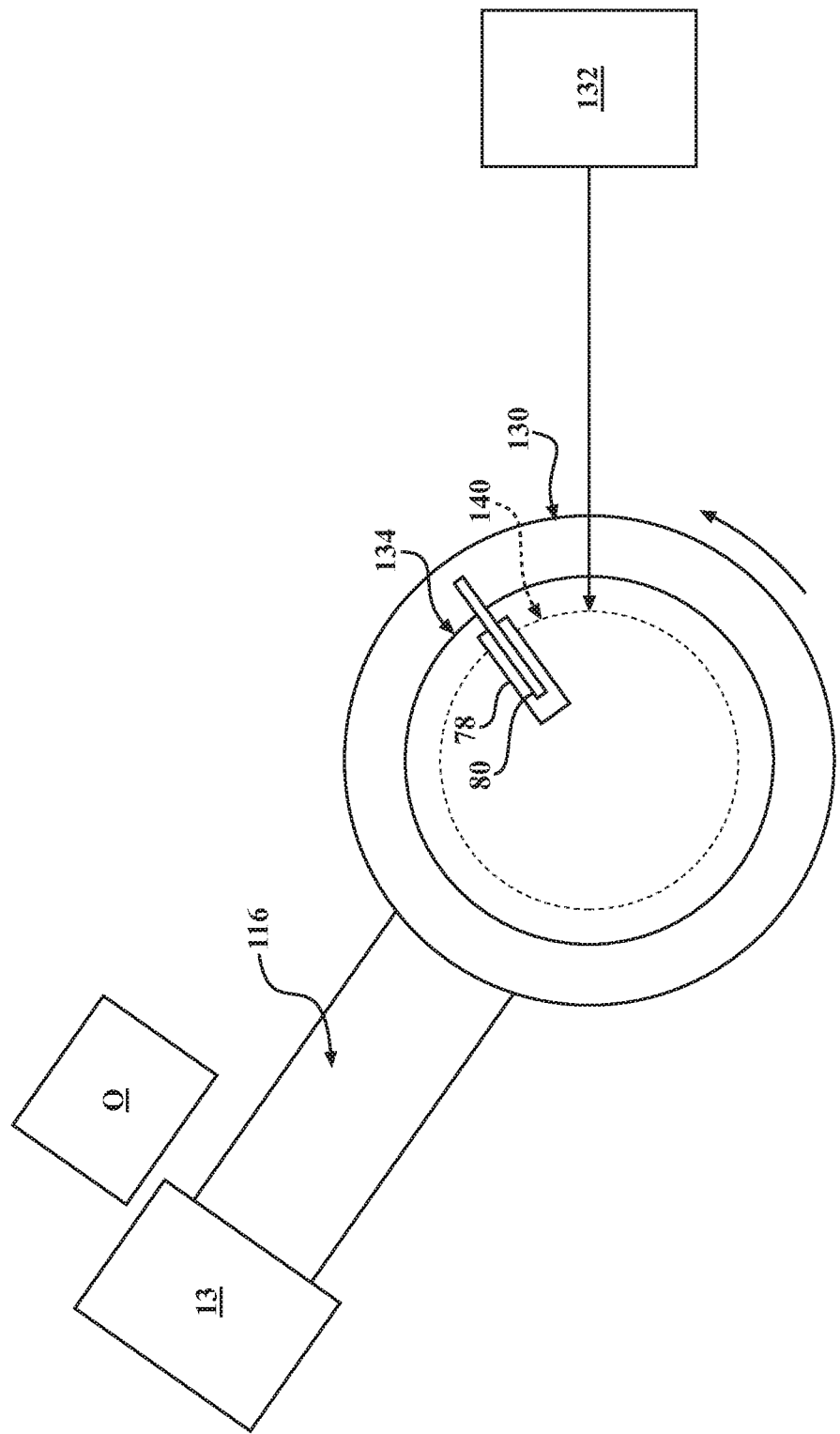
FIG. 9 is a view similar to FIG. 8 illustrating reversed movement of the first clutch member from the end of travel position back toward the home position in response to energization of the motor with the first clutch member being shown re-engaged with the second clutch member.

Upon the force F being applied to closure panel 13, as shown in FIG. 7, the clutch 140 is moved to the disengaged state (FIG. 4B), whereupon at least some of the rollers 146 are caused to be roller outwardly from detents 150' into engagement with planar surface 72, whereupon input clutch plate 134' is permitted to rotate with input gear member 134 under the driving influence from energized motor 132, while output clutch plate 130' and output gear member 130 are permitted to remain stationary or to otherwise move freely relative to input clutch plate 134' and input gear member 134. Accordingly, datum 78 and datum 80 move out of alignment with one another, as shown in FIG. 8. Motor 132 can thus continue to drive input gear member 134 and input clutch plate 134' to an end-of-travel position, which corresponds to a predetermined maximum angular displacement between input gear member 134 and output gear member 130, such as about 190 degrees, or less than a full 360 degree rotation, by way of example and without limitation, whereat datum 78 can be detected (FIG. 8 by any suitable sensor 82 configured in operable communication with motor 132. Upon sensor 82 detecting datum 78, motor 132 can be automatically reversed toward a home position to return input clutch plate 134' into engaged relation with output clutch plate 130', thereby causing clutch 140 to be re-engaged (FIG. 9), whereat all the rollers 146 are returned within axially aligned detents 150, 150' (FIG. 4A). The input clutch plate 134' and the output clutch plate 130' may be configured to move in a relative relationship to one another while in the disengaged state as shown between FIG. 7 and FIG. 8 until the input clutch plate 134' and the output 130' are configured to return to the engaged state upon the input clutch plate 134' and the output clutch plate 130' moving in an opposite relative motion, as illustrated in FIG. 8 and FIG. 9. It is recognized that a relative displacement between the input clutch plate 134' and the output clutch plate 130' may exist before reengagement of the input clutch plate 134' and the output clutch plate 130'. The input clutch plate 134' and the output clutch plate 130' may also configured to transition from the engaged state to the disengaged state at a relative position, for example, as illustrated in FIG. 8 as a relative angular position Theta (a) to one another, and configured to transition from the disengaged state to the engage state upon the input clutch plate 134' and the output clutch plate 130' returning to the relative position. Either of the input clutch plate 134' and the output clutch plate 130' may be moved by an activation of the motor, or by a manual movement by a user of the closure panel 13.

Figure 10:
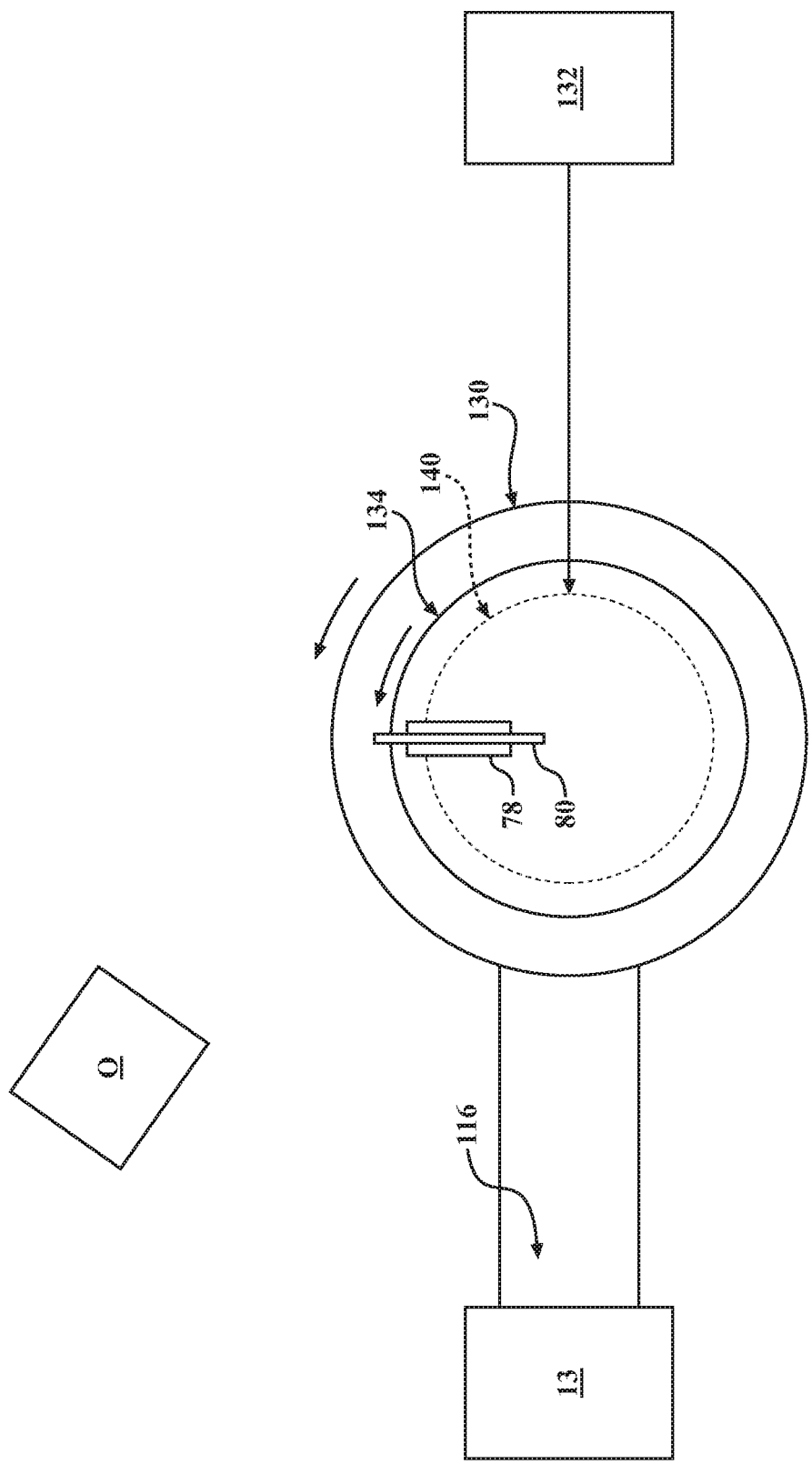
FIG. 10 is a view similar to FIG. 8 illustrating continued reversed movement of the engaged first and second clutch members back to the home position and returned movement of the closure panel in response to energization of the motor.

Then, as shown in FIG. 10, the energized motor 132 continues to drive input gear member 134, which in turn drives coupled input clutch plate 134' and output clutch plate 130' conjointly with one another, thereby driving output gear member 130, lever 116 and closure panel 13 toward and ultimately to the closed state. Of course, it is to be recognized that an externally applied force F can be applied to closure panel 13 at any time, including while in the closed state, thereby causing clutch 140 to be moved to the disengaged state while the motor 132 is energized.

Figure 11:
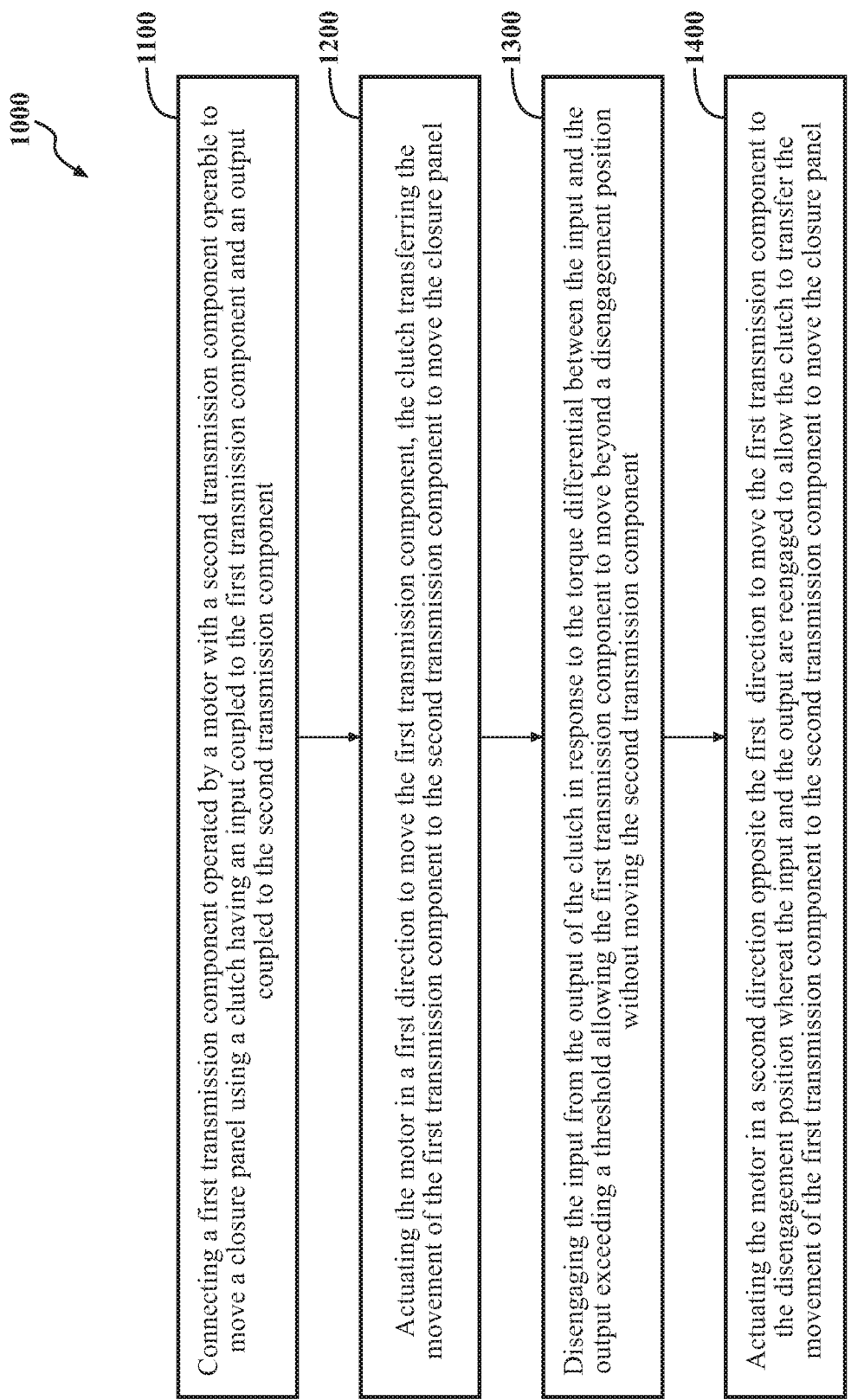
FIG. 11 illustrates a sequence of a method for providing manual interruption of a powered vehicle closure panel as the closure panel is moving under power between open and closed positions in accordance with another aspect of the disclosure.

In accordance with another aspect of the disclosure, as illustrated diagrammatically in FIG. 11, a method 1000 for providing manual interruption of a powered vehicle closure panel 13 that is pivotally coupled to a vehicle body 12 as the closure panel 13 is moving under power between open and closed positions is provided. The method includes a step 1100 of connecting a first transmission component 134, such as input gear member 134, configured in operable communication with motor 132, with a second transmission component 130, such as output gear member 130, with the second transmission component 130 being operable to move the closure panel 13 via a clutch 140 having an input, such as an input clutch plate 134', by way of example and without limitation, coupled to the first transmission component 134 and having an output, such as an output clutch plate 130', by way of example and without limitation, coupled to the second transmission component 130. Further, a step 1200 of actuating the motor 132 in a first direction to cause movement, such as rotation, of the first transmission component 134, and further causing the clutch 140 to transfer torque from the first transmission component 134 to the second transmission component 130, thereby causing concurrent movement, such as rotation, of the second transmission component 130 with the first transmission component 134. Then, a step 1300 of disengaging the input clutch plate 134' of the clutch 140 from the output clutch plate 130' of the clutch 140 in response to a torque between the input clutch plate 134' and the output clutch plate 130' exceeding a predetermined torque threshold, thereby interrupting the transfer of torque between the input clutch plate 134' and the output clutch plate 130' and allowing the first transmission component 134 to continue moving under the powered influence from the motor 132, while at the same time, allowing the second transmission component 130 to remain stationary or otherwise move relative to the first transmission component. At this time, the closure panel 13 is free for movement independent of the motor 132, even while the motor 132 remains energized, without causing damage to the motor 132. Then, a step 1400 of actuating the motor 132 to move in a second direction, opposite the first direction, and returning the first transmission component 134 to a position whereat the input clutch plate 134' and output clutch plate 130' of clutch 140 are brought back into driving engagement with one another to allow the clutch 140 to resume transferring torque between the first transmission component 134 and the second transmission component 130, such the first transmission component 134 and the second transmission component 130 move conjointly with one another without slip, thus, causing the closure panel 13 to resume powered movement in direct response to, and under the influence of, powered movement of the first transmission component 134.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power actuation system for a closure panel of a motor vehicle, the power actuation system comprising:
    an extendable member having an output end and an input end, said extendable member being configured for attachment to a first one of a vehicle body of the motor vehicle and the closure panel;
    a clutch assembly comprising an output clutch plate operably coupled to the input end, and an input clutch plate, the input clutch plate and the output clutch plate being configured to move conjointly with one another in an engaged state when a torque between the input clutch plate and the output clutch plate is below a threshold torque and to move relative to one another in a disengaged state when the torque between the input clutch plate and the output clutch plate exceeds the threshold torque; and
  a motor operably attached to a second one of the vehicle body and the closure panel, and operably coupled with the input clutch plate to move the extendable member in response to energization of said motor to move the closure panel when the clutch assembly is in the engaged state.

2. The power actuation system of claim 1, further comprising a first transmission component operably coupled to the motor and the input clutch plate of the clutch assembly, and a second transmission component operably coupled to the input end and the output clutch plate of the clutch assembly.

3. The power actuation system of claim 1, wherein the input clutch plate and the output clutch plate are configured to move in a relative relationship to one another while in the disengaged state until the input clutch plate and the output clutch plate are configured to return to the engaged state upon the input clutch plate and the output clutch plate moving in an opposite relative directions.

4. The power actuation system of claim 1, wherein the input clutch plate and the output clutch plate are configured to transition from the engaged state to the disengaged state at a relative position to one another, and then configured to transition from the disengaged state to the engage state upon the input clutch plate and the output clutch plate returning to the relative position.

5. The power actuation system of claim 1, further comprising:
  a mount member configured for attachment to the first one of the vehicle body of the motor vehicle and the closure panel;
  wherein the extendable member is a lever having a first end, configured for attachment to the second one of the vehicle body of the motor vehicle and the closure panel, and an opposite second end, said lever being pivotably mounted on said mount member between said first end and said second end;
  wherein the motor is configured to rotate an input gear member in direct response to energization of said motor, said input gear member being configured to rotate an output gear member in direct response to rotation of said input gear member, said output gear member being operably coupled with said lever to pivot said lever in response to rotation of said output gear member; and
  wherein the clutch assembly is configured for movement between a lever driving position whereat said lever is caused to pivot in response to rotation of said input gear member and a lever releasing position whereat said lever is free to pivot independent of movement of said input gear member, said clutch assembly being biased toward the lever driving position and having at least one roller disposed between said input clutch plate and said output clutch plate, said at least one roller being configured for rolling movement out of at least one detent to move said clutch assembly from the lever driving position to the lever releasing position in response to an external force applied to the closure panel.

6. The power actuation system of claim 5, wherein said second end of said lever includes teeth configured for meshed engagement with said output gear member.

7. The power actuation system of claim 5, wherein the output clutch plate is fixed to said output gear member and the input clutch plate is fixed to said input gear member, wherein said output clutch plate has a substantially planar surface with a plurality of said at least one detent extending therein and wherein said input clutch plate has a substantially planar surface with a plurality of said at least one detent extending therein, said at least one roller including a plurality of rollers disposed between said output clutch plate and said input clutch plate for receipt in said plurality of detents in said output clutch plate and in said plurality of detents in input clutch plate.

8. The power actuation system of claim 7, wherein said output clutch plate and said output gear member are a monolithic piece of material, and wherein said input clutch plate and said input gear member are a monolithic piece of material.

9. The power actuation system of claim 7, wherein at least some of said rollers are rolled outwardly from at least some of said detents in at least one of said output clutch plate and said input clutch plate while said clutch assembly is in the lever releasing position.

10. The power actuation system of claim 9, wherein each of said rollers is disposed in said detents of said output clutch plate and said input clutch plate while said clutch assembly is in the lever driving position.

11. The power actuation system of claim 9, wherein at least some of said rollers are rolled into abutment with said substantially planar surface of at least one of said output clutch plate and said input clutch plate while said clutch assembly is in the lever releasing position.

12. The power actuation system of claim 11, wherein said rollers rolled into abutment with said substantially planar surface of at least one of said output clutch plate and said input clutch plate remain disposed in said detents of the other of said output clutch plate and said input clutch plate.

13. The power actuation system of claim 11, wherein the plurality of detents of one of said input gear member and said output gear member extend in a non-uniform annular pattern about an axis of rotation, and wherein the plurality detents of the other of said input gear member and said output gear member extend in a uniform annular pattern about an axis of rotation.

14. The power actuation system of claim 1, wherein the output clutch plate and the input clutch plate are biased toward one another by a spring member.

15. A power actuation system for a closure panel of a motor vehicle, the power actuation system comprising:
  an extendable member having an output end and an input end, said extendable member being configured for attachment to a first one of a vehicle body of the motor vehicle and the closure panel;
  a clutch assembly comprising an output clutch plate operably coupled to the input end by an output gear member, and an input clutch plate, the input clutch plate and the output clutch plate being configured to move conjointly with one another in an engaged state when a torque between the input clutch plate and the output clutch plate is below a threshold torque and to move relative to one another in a disengaged state when the torque between the input clutch plate and the output clutch plate exceeds the threshold torque; and
  a motor operably attached to a second one of the vehicle body and the closure panel, and operably coupled with the input clutch plate by an input gear member to move the extendable member in response to energization of said motor to move the closure panel when the clutch assembly is in the engaged state.

16. The power actuation system of claim 15, further including at least one roller disposed between said input clutch plate and said output clutch plate, said at least one roller being configured for movement out of at least one detent to move said clutch assembly from the engaged state to the disengaged state in response to a force applied to the closure panel.

17. The power actuation system of claim 16, further including at least one spring member biasing the output clutch plate and the input clutch plate toward one another to the engaged state, wherein the forced applied to the closure panel to move the clutch assembly to the disengaged stated must be greater than the bias applied by the at least one spring member.

18. A method for providing manual interruption of a powered vehicle closure panel pivotally coupled to a vehicle body as the closure panel is moving under power between open and closed positions, the method comprising:

providing a motor operably coupled with a first transmission component for movement of the first transmission component in opposite first and second directions and configuring the motor for operable attachment to a first one of the vehicle body and the closure panel;

providing an extendable member having a first end configured for operable attachment to a second one of the vehicle body and the closure panel and an opposite second end operably coupled with a second transmission component;

operably coupling the first transmission component with an input clutch plate of a clutch assembly and operably coupling the second transmission component with an output clutch plate of the clutch assembly;

configuring the input clutch plate and the output clutch plate to rotate conjointly with one another in an engaged state when a torque between the input clutch plate and the output clutch plate is below a threshold torque during energization of the motor; and configuring the input clutch plate and the output clutch plate to rotate relative to one another in a disengaged state when the torque between the input clutch plate and the output clutch plate exceeds the threshold torque as the motor is energized.

19. The method of claim 18, further including providing a plurality of rollers disposed in detents of the input clutch plate and the output clutch plate and configuring the rollers to remain in the detents of the input clutch plate and the output clutch plate when the torque between the input and the output are below the threshold torque and configuring at least some of the rollers to roll outwardly from the detents of at least one the input clutch plate and the output clutch plate upon the threshold torque being exceeded.

20. The method of claim 18, further including configuring the input clutch plate and the output clutch plate to rotate relative to one another while in the disengaged state until the input clutch plate and the output clutch plate return to the engaged state as the motor is energized.

* * * * *